US008419245B2

(12) United States Patent  (10) Patent No.: US 8,419,245 B2
Nagai et al.  (45) Date of Patent: Apr. 16, 2013

(54) ON-BOARD INTERIOR ILLUMINATION UNIT

(75) Inventors: Kentaro Nagai, Makinohara (JP); Ryohei Ochiai, Fujieda (JP)

(73) Assignee: Yazaki Corporation, Tokyo (JP)

( * ) Notice: Subject to any disclaimer, the term of this patent is extended or adjusted under 35 U.S.C. 154(b) by 123 days.

(21) Appl. No.: 13/131,160

(22) PCT Filed: Nov. 26, 2009

(86) PCT No.: PCT/JP2009/069971
§ 371 (c)(1),
(2), (4) Date: May 25, 2011

(87) PCT Pub. No.: WO2010/061897
PCT Pub. Date: Jun. 3, 2010

(65) Prior Publication Data
US 2011/0222306 A1  Sep. 15, 2011

(30) Foreign Application Priority Data
Nov. 26, 2008 (JP) ................................. 2008-301254

(51) Int. Cl.
*H02G 3/00* (2006.01)
*F21S 8/10* (2006.01)

(52) U.S. Cl.
USPC ............ 362/490; 362/488; 362/489; 439/419

(58) Field of Classification Search .................. 362/488, 362/489, 490, 483, 479; 439/419, 417; 200/252, 200/530
See application file for complete search history.

(56) References Cited

U.S. PATENT DOCUMENTS

| 5,064,383 | A * | 11/1991 | Locati et al. .................. 439/405 |
| 7,070,442 | B2 * | 7/2006 | Yamanashi et al. ........... 439/417 |
| 2005/0207158 | A1 | 9/2005 | Nagai | |
| 2009/0183915 | A1 * | 7/2009 | Suzuki ........................ 174/70 R |

FOREIGN PATENT DOCUMENTS

| JP | 1-129768 U | 9/1989 |
| JP | 2-124344 A | 5/1990 |
| JP | 2001-294082 A | 10/2001 |
| JP | 2005-263078 A | 9/2005 |
| JP | 2007-245795 A | 9/2007 |

OTHER PUBLICATIONS

International Search Report for PCT/JP2009/069971 dated Jan. 26, 2010 [PCT/ISA/210].

* cited by examiner

*Primary Examiner* — Karabi Guharay
(74) *Attorney, Agent, or Firm* — Sughrue Mion, PLLC

(57) ABSTRACT

There is provided an on-board interior illumination unit which is so strong as to withstand vibration, high temperatures and low temperatures, and tensile load, to thereby be superior in contact reliability and which can be made small in size. Thus, there is provided an on-board interior illumination unit comprising a design portion 10 and a function part 20 which is disposed on a side of the design portion 10 which lies on an outer side of a passenger compartment, wherein the function part 20 has a function part main body 21 which has a switch portion 24 and a lamp installation portion 25 and a terminal exposure portion 21a in which a plurality of press-contact terminals 27 are exposed which are electrically connected to the switch portion 24 and the lamp installation portion 25 and a protection cover 30 which is installed in the function part main body 21 so as to cover the terminal exposure portion 21a, and wherein a protection cover side connector 32 is provided in the protection cover 30 which fits on a wiring harness side connector 40, the protection cover side connector 32 including a connector housing portion 33 which is formed integrally with the protection cover 30 and a plurality of terminals 34 which are fixed in place in the protection cover 30 and which fit individually in the press-contact terminals in a process of the protection cover 30 being installed in the function part main body 21.

12 Claims, 23 Drawing Sheets

ON-BOARD INTERIOR ILLUMINATION UNIT

TECHNICAL FIELD

The present invention relates to an on-board interior illumination unit for use in illuminating an interior of a passenger compartment of a vehicle.

BACKGROUND ART

As interior illumination systems to which the invention pertains, there are interior illumination systems disclosed in Patent Document 1 and Patent Document 2. As is shown in FIG. 29, an interior illumination system 100 disclosed in Patent Document 1 includes lamp units 101, 102, which are two on-board interior illumination units, a switch unit 103, which is an on-board interior illumination unit interposed between the two lamp units, a wiring harness WH which constitutes a path that is laid to connect at least the two lamp units 101, 102 and the switch unit 103 and an illumination cover 104 which accommodates the two lamp units 101, 102 and the switch unit 103 and which is fixed to a ceiling of a passenger compartment of a vehicle.

As is shown in FIG. 30, each of the lamp units 101, 102 of the interior illumination system disclosed in Patent Document 1 has a function part main body 110 and an electric wire protection cover 111 which is installed on the function part main body 110. The function part main body 110 has a housing 112, a lamp 113 which is detachably provided in this housing 112 and a separate switch 114 which is detachably provided in the housing 112. An electric wire lay-down portion 115 is formed on one surface side of the housing 112. A plurality of press-contact terminals 116 are erected in the electric wire lay-down portion 115. The wiring harness WH is laid down in the electric wire lay-down portion 115, so that individual electric wires w of the wiring harness WH are press contacted to desirable press-contact terminals 116. The separate switch 114 is configured so as to select an illumination turn-on mode and a door mode.

In addition, a pair of locking recess portions 112a is provided on each of left- and right-hand side walls of the housing 12 which are positioned at both ends of the electric wire lay-down portion 115 and in positions which face each other. The electric wire protection cover 111 has a pair of electric wire bending projecting portions 111a which projects further downwards than a central inner surface. A locking claw 111b is provided individually on both side surfaces of each electric wire bending projecting portion 111a. The electric wire protection cover 111 covers the wiring harness WH laid down in the electric wire lay-down portion 115 from thereabove, and the locking claws 111b are locked individually in the corresponding locking recess portions 112a in the housing 112.

The switch unit 103 includes, as is shown in FIG. 29, a function part main body 120 in which press-contact terminals (not shown) are erected in an electric wire lay-down portion (not shown) and the electric wires w of the wiring harness WH are press contacted to the press-contact terminals, an electric wire protection cover 121 which is installed on the function part main body 120 and which covers the electric wires w which are laid down in the electric wire lay-down portion and a mode changeover switch (not shown) which is provided in the function part main body 120. The mode changeover switch is configured so as to select an illumination turn-off mode and a door mode.

As is shown in FIG. 31, an interior illumination system 130 disclosed in Patent Document 2 includes lamp units 131, 132, 133, which are three on-board interior illumination units, a switch unit, which is an on-board interior illumination unit interposed between the lamp units 131, 132 and a plurality of inter-unit electric wires 135 which connect the three lamp units 131, 132, 133 and the switch unit 134, and the three lamp units 131, 132, 133 and the switch unit 134 are fixed to a ceiling trim 136 of a passenger compartment. The lamp unit 131 is connected to a wiring harness WH which is laid on the side of a vehicle body.

As is shown in detail in FIG. 32, the lamp unit 131 of the second conventional example has a function part main body 140, and this function part main body 140 has a switch portion 141, a lamp installation portion 142 and two connectors 143 (only one of which is shown). A lamp 144 is installed in the lamp installation portion 142. A connector (not shown) on a side of the lamp unit 131 which faces the inter-unit electric wires 135 shown in FIG. 31 is installed in one of the two connectors which is not shown. A connector 145 connected to the wiring harness WH laid down on the vehicle body is installed in a connector 143 shown in FIGS. 31 and 32.

RELATED ART DOCUMENT

Patent Document

Patent Document 1: JP-A-2005-263078
Patent Document 2: JP-A-2007-245795

SUMMARY OF INVENTION

Technical Problem

Since the lamp unit 102 of the first conventional example is electrically connected with the wiring harness WH through press-contact by the press-contact terminals 116, the connection between the lamp unit 102 and the wiring harness WH is caused to fail easily by vibration, high temperatures/low temperatures, tensile load and the like and hence, the reliability in contact thereof is low.

In contrast with this, since the lamp unit 131 of the second conventional lamp unit 131 is electrically connected with the wiring harness WH by the connectors, the connection between the lamp unit 131 and the wiring harness WH withstands vibration, high temperatures/low temperatures, tensile load and the like and hence, the contact reliability thereof is high.

In the lamp unit 131 of the second conventional example, however, since the connectors 143 are provided in the function part main body 140, the connectors 143 need to be fabricated while taking into consideration the fabrication and strength of the switch portion 141 and the lamp installation portion 142, and this makes it unable for the switch portion 141, the lamp installation portion 142 and the connectors 143 to be disposed very closely to one another, leading to a problem that the function part is made large in size. When the function part is made large in size, the lamp unit 131, which is the on-board interior illumination unit, is made, in turn, large in size, leading to a fear that the lamp unit 131 cannot be installed in the interior illumination system due to the construction of the vehicle.

Then, the invention has been made with a view to solving the problems, and an object thereof is to provide an on-board interior illumination unit which withstands vibration, high temperatures/low temperatures, tensile load and the like so strongly as to exhibit superior contact reliability and which can be made small in size.

Solution to Problem

According to a first aspect of the invention, there is provided an on-board interior illumination unit comprising a design portion which is fixed to a body side member; and a function part which is disposed on a side of the design portion which lies on an outer side of a passenger compartment, wherein the function part includes: a function part main body which has at least one of a switch portion and a lamp installation portion and a terminal exposure portion in which a plurality of press-contact terminals are exposed which are electrically connected to at least the one of the switch portion and the lamp installation portion; and a protection cover which is installed in the function part main body so as to cover the terminal exposure portion, and wherein a protection cover side connector is provided in the protection cover which fits on a wiring harness side connector, and the protection cover side connector includes a connector housing portion which is integrally formed with the protection cover and a plurality of terminals which are fixed in the protection cover and which fit respectively in the press-contact terminals in a process of the protection cover being attached to the function part main body.

According to a second aspect of the invention, there is provided an on-board interior illumination unit as set forth in the first aspect, wherein positions of the terminals of the protection cover side connector and press contact positions of the corresponding press-contact terminals are disposed on straight lines.

According to a third aspect of the invention, there is provided an on-board interior illumination unit as set forth in the first or second aspect, wherein the protection cover is configured to be attached to the function part main body so as to cover the terminal exposure portion in a state where a wiring harness is press contacted to the press-contact terminals through press-contact.

According to a fourth aspect of the invention, there is provided an on-board interior illumination unit as set forth in any of the first to third aspects, wherein a plurality of protection cover side connectors like the protection cover side connector are provided in the protection cover so that installing directions into the protection cover side connectors differ from each other.

According to a fifth aspect of the invention, there is provided an on-board interior illumination unit as set forth in the fourth aspect, wherein the plurality of protection cover side connectors are two connectors which are provided at both end sides of the protection cover which lie on a straight line, and positions of terminals of the two protection cover side connectors and press contact positions of the corresponding press-contact terminals are disposed to line on straight lines.

According to a sixth aspect of the invention, there is provided an on-board interior illumination unit as set forth in any of the first to fifth aspects, wherein holes are provided in a bottom portion of the connector housing portion through which the terminals are inserted.

In addition, according to a seventh aspect of the invention, there is provided a vehicle interior illumination function part having a main body, including: at least one of a lamp installation portion and a switch portion; and a terminal exposure portion in which a plurality of press-contact terminals are exposed, the press-contact terminals being electrically connected to at least the one of the lamp installation portion and the switch portion; and a protection cover including: a cover main body to which a plurality of terminals connected to the press-contact terminals are fixed; and a protection cover side connector which covers a wiring harness side connector which is electrically connected to the function part and which includes a connector housing which is integrally formed with the cover main body, and configured to cover the terminal exposure portion.

Advantageous Effects of Invention

According to the first aspect of the invention, since it is connected with the wiring harness via the connectors, the on-board interior illumination unit is so strong as to withstand vibration, high temperatures and low temperatures, and tensile load and has the superior contact reliability. In addition, since the connector is provided in the protection cover, the connector can be provided without taking into consideration the fabrication and strength of the switch portion and the lamp installation portion, and therefore, the function part can be made small in size, which can eventually realize a reduction in size of the on-board interior illumination unit.

In addition, in the case of there being a plurality of types of wiring harness side connectors, in the conventional examples, the number of types of function part main bodies is increased accordingly, and there exists no part that can be standardized. In the invention, however, the increase in the number of types of wiring harness side connectors can be dealt with only by increasing accordingly the number of types of protection covers which each have a connector so as to commonize the function part main body. Consequently, the function part main body can be standardized and made small in size.

Further, the terminals are fixed in place in the protection cover, and the protection cover is then installed in the function part main body, whereby the terminals of the connector and the press-contact terminals on the function part main body are electrically connected together. Consequently, the electrical connection work between the protection cover side and the function part main body side can be facilitated.

According to the second aspect of the invention, since the versatile straight terminals can be used as the terminals, the costs for terminals can be reduced, and the facilitation in installation of the terminals can be realized.

According to the third aspect of the invention, the on-board interior illumination unit can electrically be connected with the wiring harness through press-contact by the press-contact connectors in addition to the connector connection, and therefore, the degree of freedom in designing a wiring harness is increased.

According to the fourth aspect of the invention, the degree in freedom in laying out the wiring harness is increased. In addition, the wiring harness can branch off or merge at the location where the on-board interior illumination unit exists, whereby the degree of freedom in laying out the other on-board interior illumination units and designing the wiring harness is increased.

According to the fifth aspect of the invention, since the versatile straight terminals can be used as the terminals, the costs for terminals can be reduced, and the facilitation in installation of the terminals can be realized.

According to the sixth aspect of the invention, since the terminals can be fixed in place in the protection cover by inserting the terminals from the interior of the connector housing portion, the workability in fixing the terminals is improved.

DESCRIPTION OF EMBODIMENTS

Hereinafter, embodiments of the invention will be described based on the drawings.

First Embodiment

Figure 1:
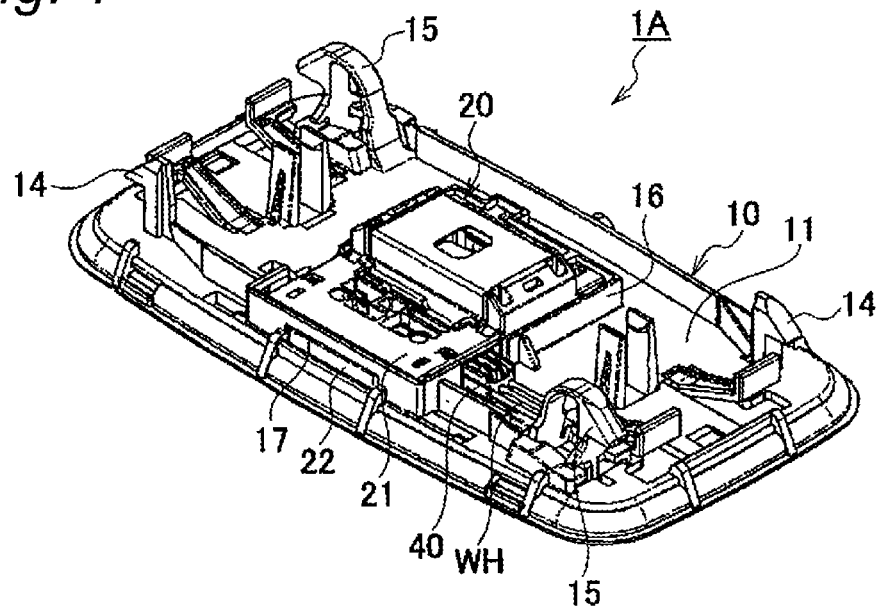
FIG. 1 shows a first embodiment of the invention and is a perspective view of an on-board interior illumination unit as viewed from a back side of a ceiling.
Figure 4:
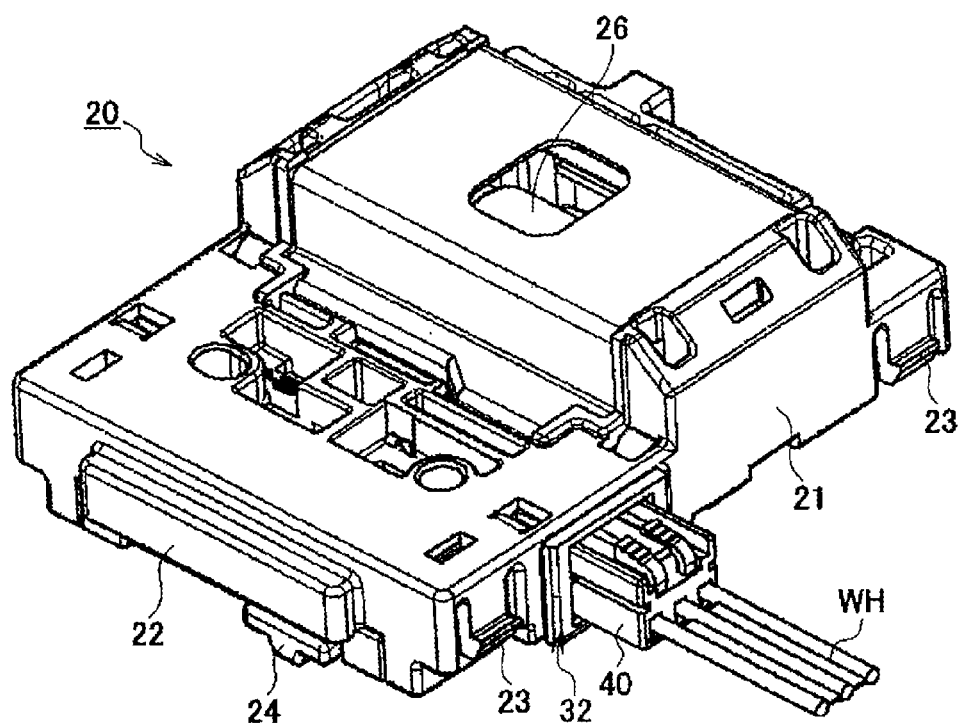
FIG. 4 shows the first embodiment of the invention and is a perspective view of a function part as viewed from the back side of the ceiling.
Figure 5:
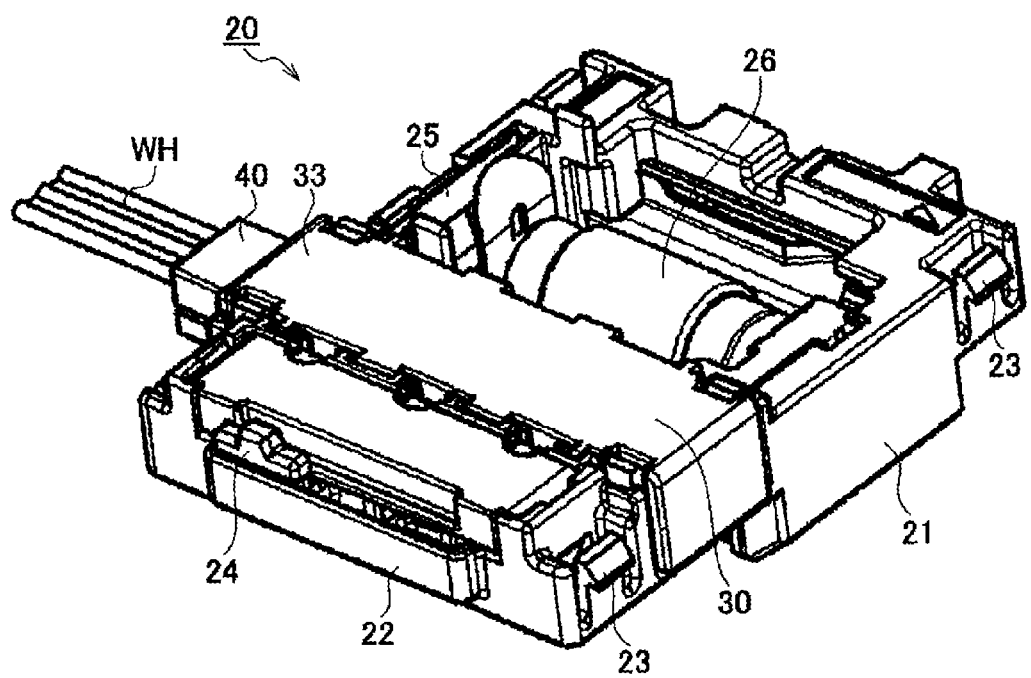
FIG. 5 shows the first embodiment of the invention and is a perspective view of the function part as viewed from the interior of the passenger compartment.
Figure 6:
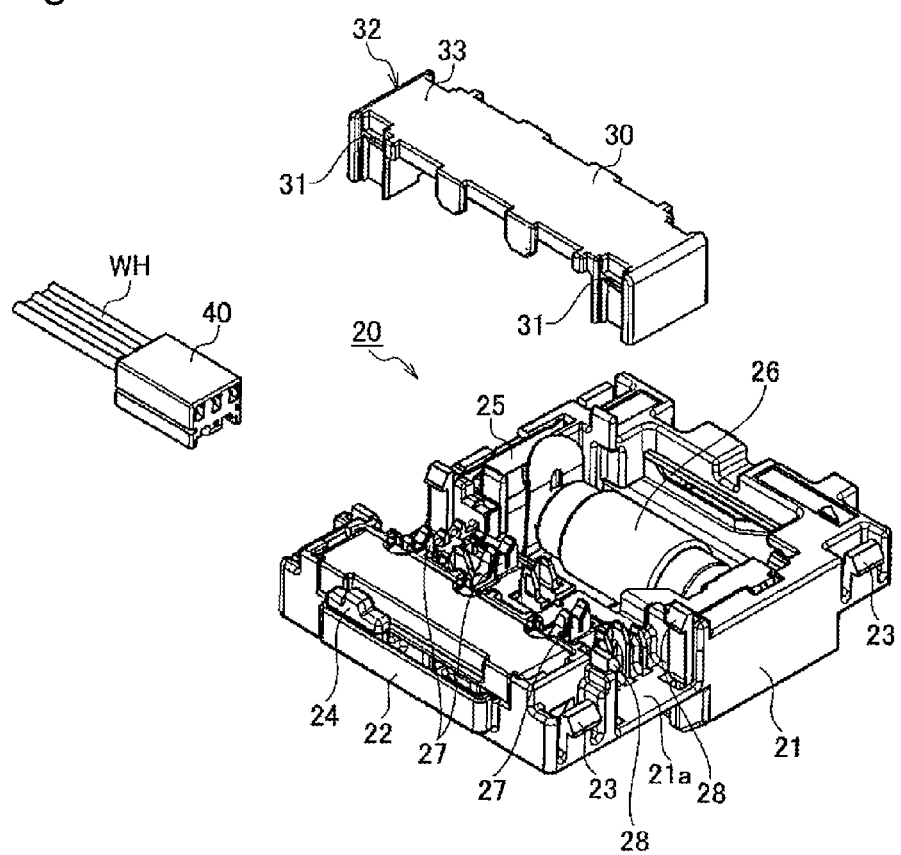
FIG. 6 shows the first embodiment of the invention and is an exploded perspective view of the function part.
Figure 7:
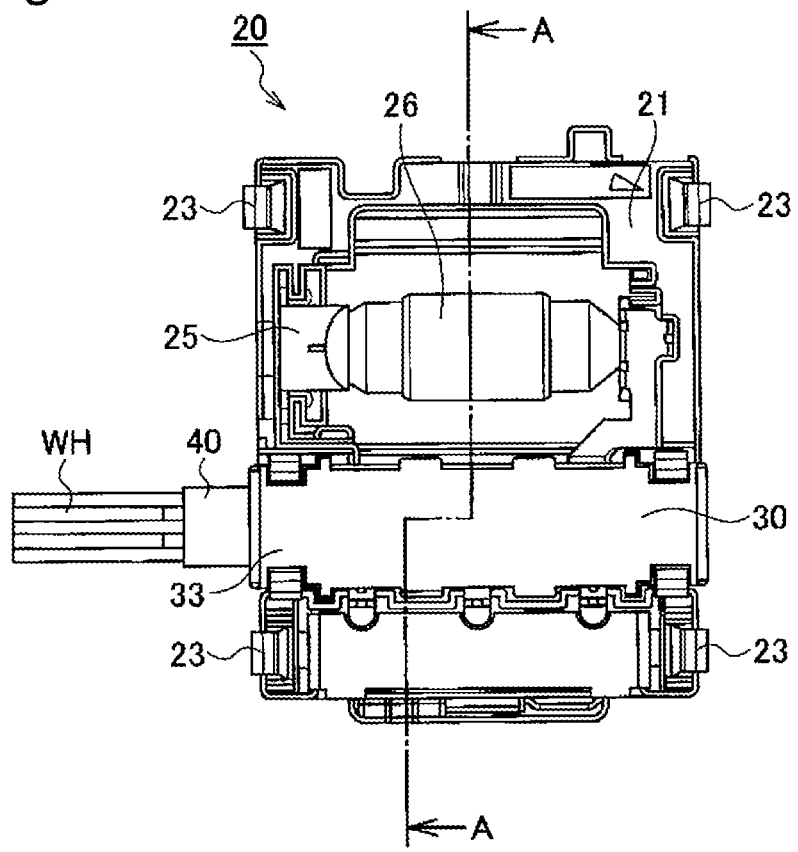
FIG. 7 shows the first embodiment of the invention and is a plan view of the function part.
Figure 8:
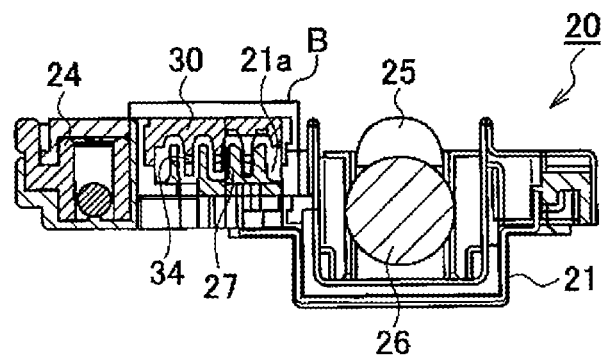
FIG. 8 shows the first embodiment of the invention and is a sectional view taken along the line A-A in FIG. 7.
Figure 9:
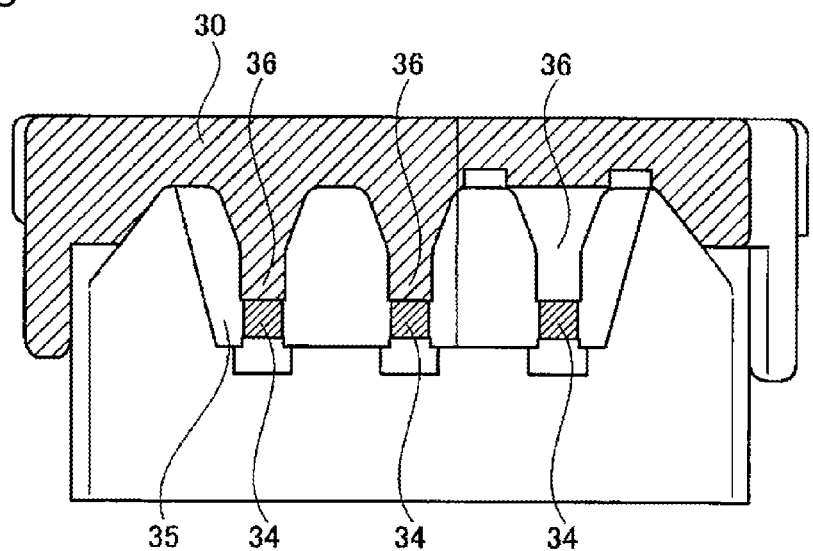
FIG. 9 shows the first embodiment of the invention and is an enlarged sectional view of a protection cover only in a portion B in FIG. 8.
Figure 10:
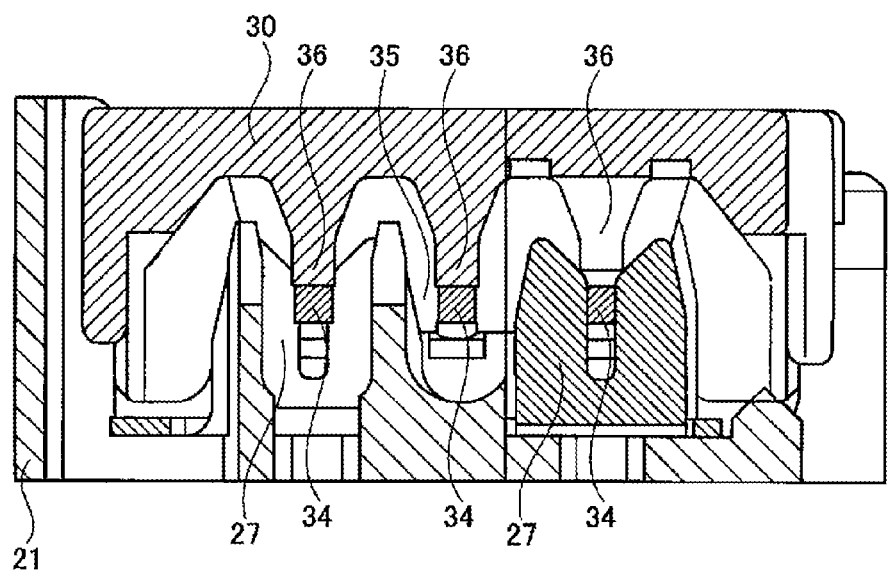
FIG. 10 shows the first embodiment of the invention and is an enlarged sectional view of the portion B in FIG. 8.

FIGS. 1 to 14 show a first embodiment of the invention. FIG. 1 is a perspective view of an on-board interior illumination unit 1A as viewed from a back side of a ceiling, FIG. 2 is a perspective view of the on-board interior illumination unit 1A as viewed from an interior of a passenger compartment, FIG. 3 is an exploded perspective view of the on-board interior illumination unit 1A, FIG. 4 is a perspective view of a function part 20 as viewed from the back side of the ceiling, FIG. 5 is a perspective view of the function part 20 as viewed from the interior of the passenger compartment, FIG. 6 is an exploded perspective view of the function part 20, FIG. 7 is a plan view of the function part 20, FIG. 8 is a sectional view taken along the line A-A in FIG. 7, FIG. 9 is an enlarged sectional view of a protection cover 30 only in a portion B in FIG. 8, FIG. 10 is an enlarged sectional view of the portion B in FIG. 8, and FIGS. 11 to 14 are perspective views showing installation steps of the function part 20.

Figure 2:
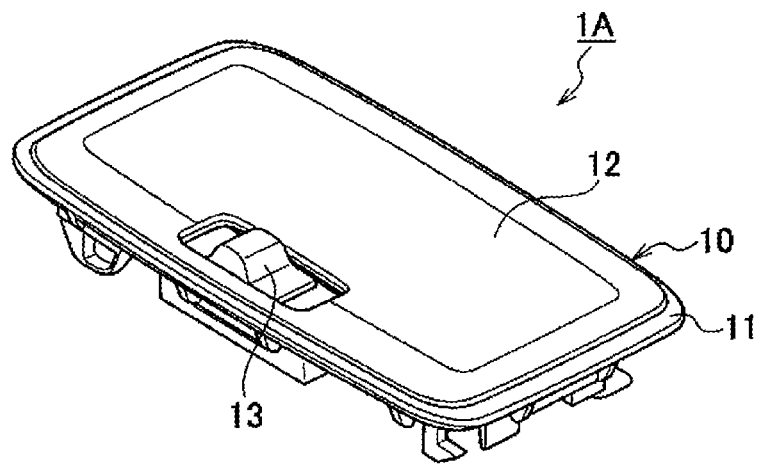
FIG. 2 shows the first embodiment of the invention and is a perspective view of the on-board interior illumination unit as viewed from an interior of a passenger compartment.
Figure 3:
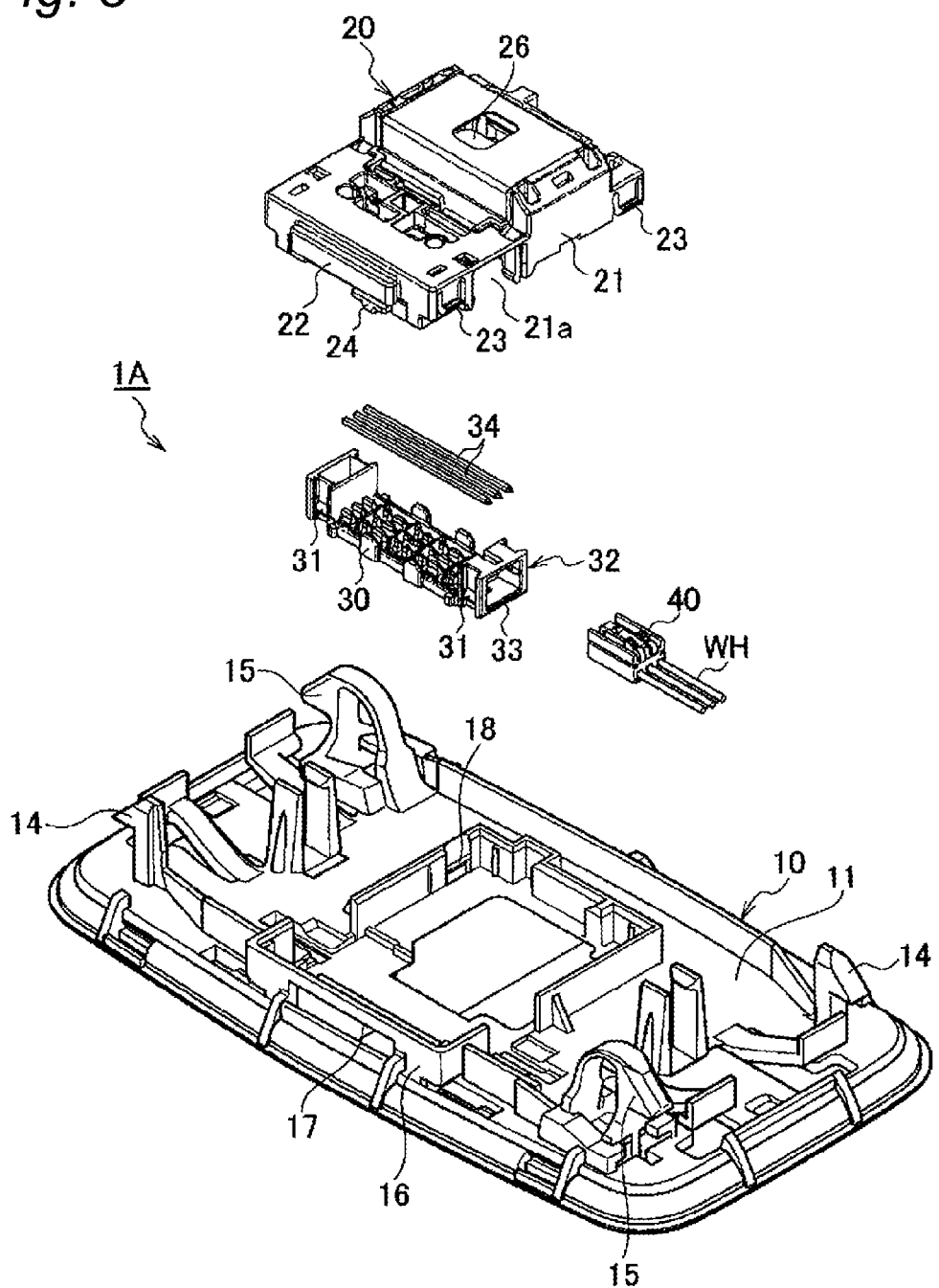
FIG. 3 shows the first embodiment of the invention and is an exploded perspective view of the on-board interior illumination unit.

As is shown in FIGS. 1 to 3, an on-board interior illumination unit 1A is attached to a body (not shown), which is a body side member which is disposed in a ceiling position of a vehicle and an interior wall material (not shown) and includes a design portion 10 which is disposed on an inner side of a passenger compartment and a function part 20 which is disposed on a side of the design portion 10 which is positioned on an outer side of the passenger compartment.

The body has cutout portions (not shown) for lock arms at two locations, and locking portions (not shown) are provided in proximity to the corresponding lock arm cutout portions.

A function part opening portion (not shown) is formed in the interior wall material, and lock arm locking holes (not shown) and lock arm insertion holes are each provided at two locations which are situated outwards of the function part opening portion.

The design portion 10 includes a housing 11, a lens cover 12 which is installed on a passenger compartment side of the housing 11 so as to cover the passenger compartment side which includes a light passage opening portion (not shown), and a switch control portion 13 which is installed so as to be operated from the passenger compartment side of the housing 11. Wall material lock arms 14 are provided on a circumferential edge portion of the housing 11 at two locations thereon which lie on a diagonal of the housing 11. In addition, body lock arms 15 are provided on the circumferential edge portion of the housing 11 at two locations thereon which lie on the other diagonal of the housing 11. These body lock arms 15 are locked on the locking portions on the body, whereby the design portion 10 is installed on the body.

a function port holding frame 16 is erected so as to surround the light passage opening portion on the side of the design portion 10 which is positioned on the outer side of the passenger compartment and in a central position of the design portion 10. Design side locking portions 17, 18 are provided at a plurality of locations on the function part holding frame 16.

As is shown in detail in FIGS. 4 to 10, the function part 20 has a function part main body 21 and a protection cover 30 which is installed in the function part main body 21. Function side lock portions 22, 23 are provided on an outer circumference of the function part main body 21. The function part 20 is installed in the design portion 10 by causing the function side lock portions 22, 23 to be locked in the design side locking portions 17, 18. A switch portion 24 and a lamp installation portion 25 are provided on the function part main body 21. The switch portion 24 is made to be controlled by the switch control portion 13. A lamp 26 is installed in the lamp installation portion 25.

In addition, a plurality of busbars (not shown) are provided in the function part main body 21 through insert molding, for example. Electric circuitries to the switch portion 24 and the lamp installation portion 25 are made by the plurality of busbars, and a plurality of press-contact terminals 27 are provided by making use of part of the plurality of busbars. The plurality of press-contact terminals 27 are disposed in such a state that they are exposed in a terminal exposure portion 21a of the function part main body 21. A pair of locking portions 28 are provided on both sides of the terminal exposure portion 21a.

The protection cover 30 has a pair of lock portions 31 at both longitudinal ends on both sides thereof. The protection cover 30 is installed in the function part main body 21 so as to cover the terminal exposure portion 21a by causing the lock portions 31 to be locked in the locking portions 28. A protection cover side connector 32 which fits on a wiring harness WH side connector 40 (hereinafter, referred to simply as a "connector 32") is provided at one of the longitudinal ends of the projection cover 30.

The connector 32 includes a connector housing portion 33 which is formed integrally with the protection cover 30 and a plurality of terminals 34 which are fixed to the protection cover 30. Holes (not shown) are provided in a bottom portion of the connector housing portion 33 into which the terminals 34 are inserted. One part of each terminal 34 is accommodated within the connector housing 33 and the other part of the terminal 34 projects to the outside of the connector housing portion 33. Each terminal 34 is fixed to the protection cover 30 as will be described below at this projecting portion thereof. The plurality of terminals 34 are fitted in the corresponding press-contact terminals 27 in a process of the terminals 34 being installed in the function part main body 21. Positions of the terminals 34 of the connector 32 and press contact positions of the corresponding press-contact terminals 27 are each disposed on a straight line. Consequently, each terminal 34 is a straight conductive angular material.

In addition, terminal holding portions 35 and terminal pressing portions 36 are provided alternately at intervals in a longitudinal direction of the protection cover 30 on an inner side of a central portion of the protection cover 30. Each terminal 34 is supported in installation positions by the terminal holding portions 35. Then, when the protection cover 30 is installed in the function part main body 21, each terminal 34 is inserted into slots in the insulation displacement terminals 27 in an ensured fashion in the process of installation by the terminal pressing portions 36.

Further, an electric wire protection cover (not shown) can be installed in the function part main body 21 in place of the protection cover 30. The electric wire protection cover (not shown) is installed in the function part main body 21 so as to cover the terminal exposure portion 21a in such a state that the wiring harness WH is connected to the individual press-contact terminals 27 with insulations of the electric wires of the wiring harness WH displaced.

Figure 11:
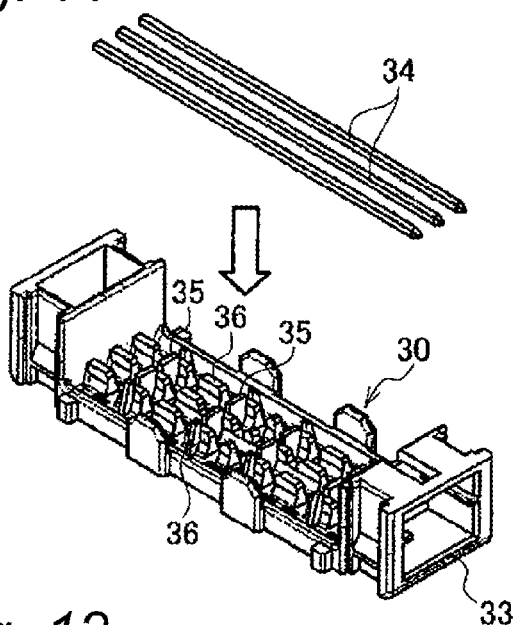
FIG. 11 shows the first embodiment of the invention and is a perspective view showing an installation step of the function part.
Figure 12:
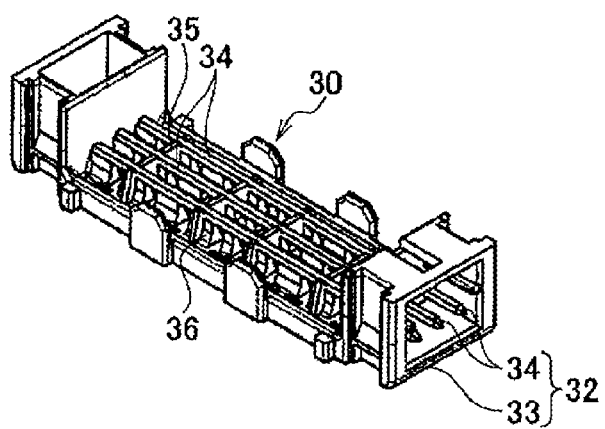
FIG. 12 shows the first embodiment of the invention and is a perspective view showing an installation step of the function part.

Next, a procedure will be described of installing the protection cover 30 into the function part main body 21. Firstly, as is shown in FIG. 11, the plurality of terminals 34 are installed in the protection cover 30. Each terminal 34 is installed in the protection cover 30, for example, by inserting the terminal 34 from an opening side of the connector housing portion 33, causing the terminal 34 to project to the outside from the hole (not shown) in the bottom portion of the connector housing portion 33 and holding the projecting portion of the terminal 34 by the terminal holding portions 35. Alternatively, each terminal 34 may be installed in the protection cover 30 by causing the terminal 34 to approach the installation position, inserting a distal end side of the terminal 34 into an interior of the connector housing portion 33 via the hole (not shown) in a bottom surface of the connector housing portion 33, and thereafter, positioning the terminal 34 so as to be held by the terminal holding portions 35. In this way, the plurality of terminals 34 are installed in the protection cover (refer to FIG. 12).

Figure 13:
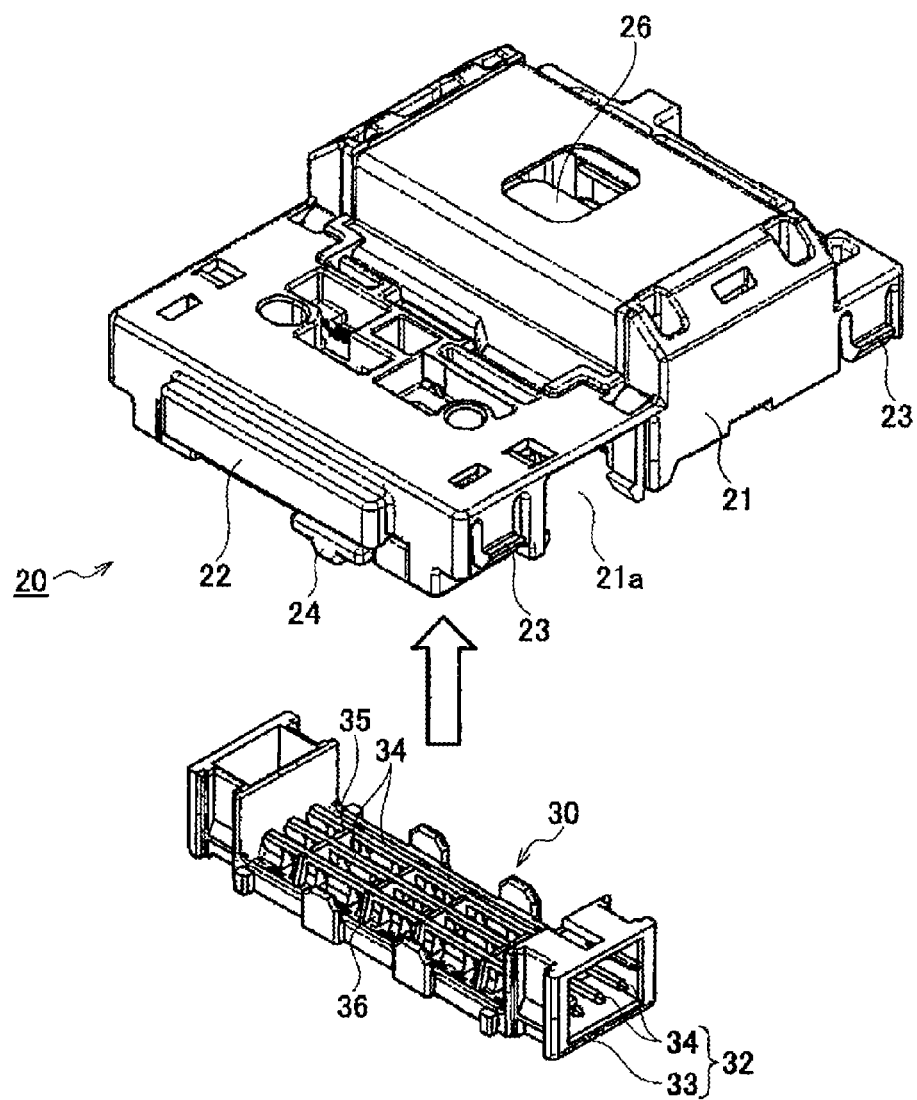
FIG. 13 shows the first embodiment of the invention and is a perspective view showing an installation step of the function part.

Next, as is shown in FIG. 13, the protection cover 30 is installed in the function part main body 21 so as to cover the terminal exposure portion 21a. In this installation process, the terminals 34 are inserted into the slots in the corresponding press-contact terminals 27 (refer to FIG. 10), and the terminals 34 and the press-contact terminals 27 which correspond to each other are electrically connected. In this installation process, since the terminal pressing portions 36 of the protection cover 30 press the individual terminals 34 to proper inserting positions in the slots in the corresponding press-contact terminals 27, the individual terminals 34 are connected to the corresponding press-contact terminals 27 through press-contact in an ensured fashion.

Figure 14:
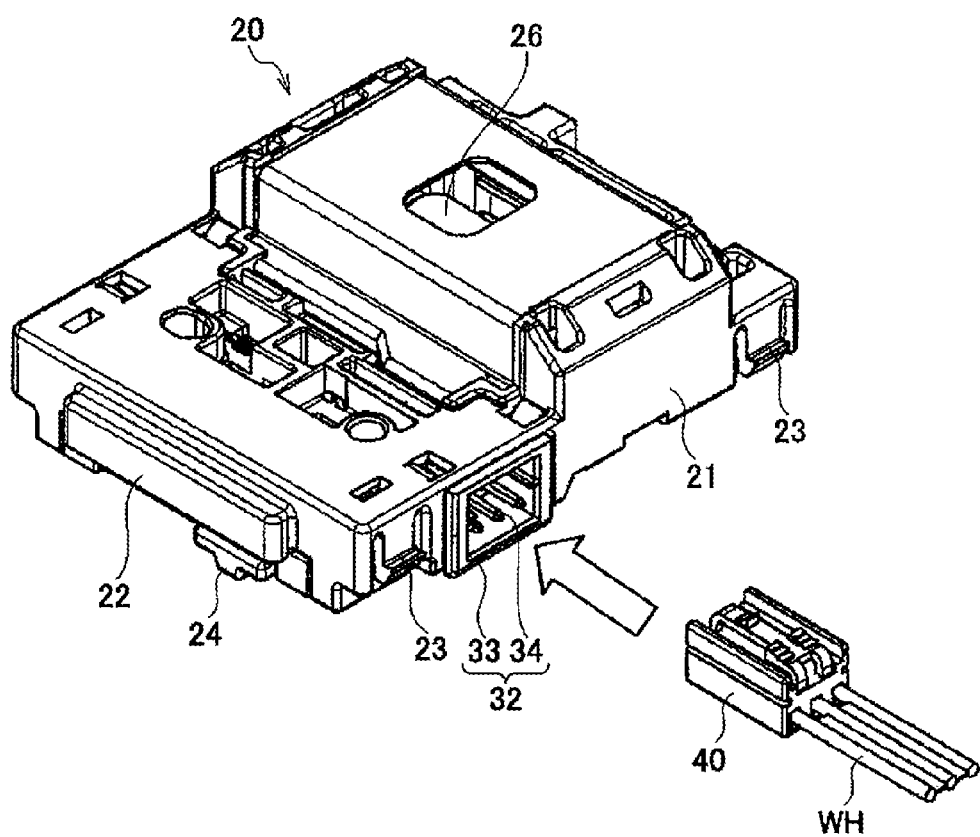
FIG. 14 shows the first embodiment of the invention and is a perspective view showing an installation process of the function part.

Thereafter, the function part 20 is installed in the design portion 10 to thereby fabricate the on-board interior unit 1A. Then, before or after the on-board interior illumination unit is installed on the body side member, the wiring harness side connector 40 is installed in the connector 32 of the function part 20 as is shown in FIG. 14, whereupon an on-board interior illumination system is completed.

Thus, in the on-board interior illumination unit 1A, the function part 20 has the function part main body 21 which has the switch portion 24 and the lamp installation portion 25, and the protection cover 30 which is installed in the function part main body 21. In addition, the connector 32 is provided in the protection cover 30 for fitting on the wiring harness side connector 40. Therefore, the connection of the on-board interior illumination unit 1A with the wiring harness WH is implemented via the connector 32. Consequently, the on-board interior illumination unit 1A is so strong as to withstand vibration, high temperatures and low temperatures and tensile load and has superior contact reliability. Then, the connector 32 is provided in the protection cover 30, and hence, the connector can be fabricated without taking into consideration the fabrication and strength of the switch portion 24 and the lamp installation portion 25. Therefore, the switch portion 24, the lamp installation portion 25 and the connector 32 can be disposed very closely to one another, and hence, the function part 20 cam be made small in size, whereby the on-board interior illumination unit 1A can, in turn, be made small in size.

In the event that there are a plurality of types of wiring harness side connectors 40, in the conventional examples, the number of types of function part main bodies 21 is increased accordingly, and there exists no part that can be standardized. In the invention, however, the increase in the number of types of wiring harness side connectors 40 can be dealt with only by increasing accordingly the number of types of protection covers 30 which each have a connector 32 while the function part main body 21 is left commonized. Consequently, the function part main body 21 can be standardized and made small in size.

The function part main body 21 has the terminal exposure portion 21a in which the plurality of press-contact terminals 27 are exposed which are electrically connected with the switch portion 24 and the lamp installation portion 25. Then, the protection cover 30 is installed in the function part main body 21 so as to cover the terminal exposure portion 21a. In addition, the plurality of terminals 34, which are fixed in the corresponding press-contact terminals 27 in the process of being installed in the function part main body 21, are fixed in place in the protection cover 30. Thus, when the terminals 34 are fixed to the protection cover 30 and the protection cover 30 is installed in the function part main body 21, the terminals 34 of the connector 32 are electrically connected to the press-contact terminals 27 on the side of the function part main body 21, whereby electric connection work between the protection cover 30 side and the function part main body 21 side is facilitated.

The positions of the terminals 34 of the connector 32 and the press contact positions of the corresponding press-contact terminals 27 are disposed on the straight line, and therefore, versatile straight terminals can be used as the terminals 34, thereby making it possible to reduce the cost for terminals and facilitate the installation of the same.

The electric protection cover (not shown) can be installed in the function part main body 21 so as to cover the terminal exposure portion 21a. Therefore, the electric connection with the wiring harness WH can also be implemented by the press-contact by the press-contact terminals 27 in addition to the connector connection, this increasing the degree of freedom in designing a wiring harness.

The holes (not shown) through which the terminals 34 are inserted are provided in the bottom portion of the connector housing portion 33. Therefore, since the terminals 34 can be inserted from an interior of the connector housing portion 33 so as to be fixed in place in the protection cover 30, good workability in fixing the terminals 34 can be provided.

Second Embodiment

Figure 15:
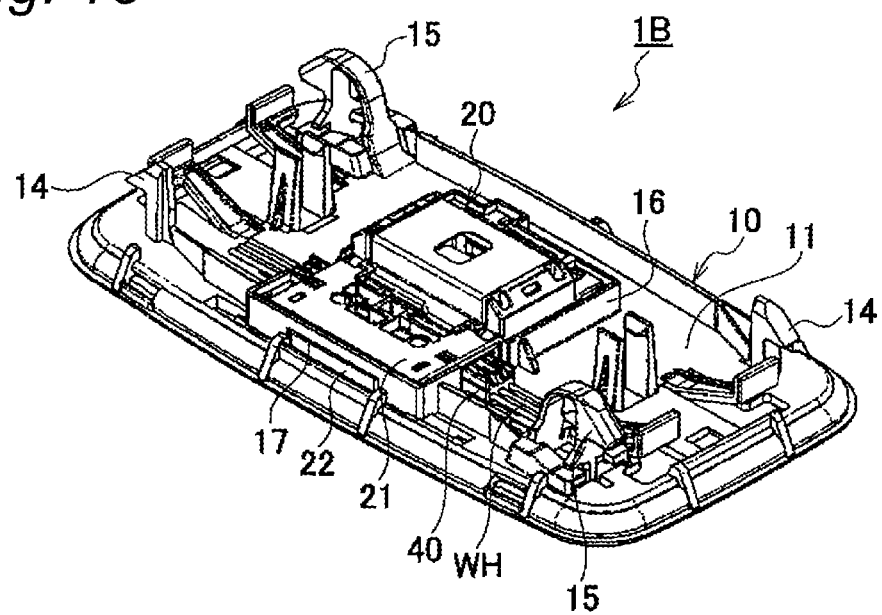
FIG. 15 shows a second embodiment of the invention and is a perspective view of an on-board interior illumination unit as viewed from a back side of a ceiling.
Figure 16:
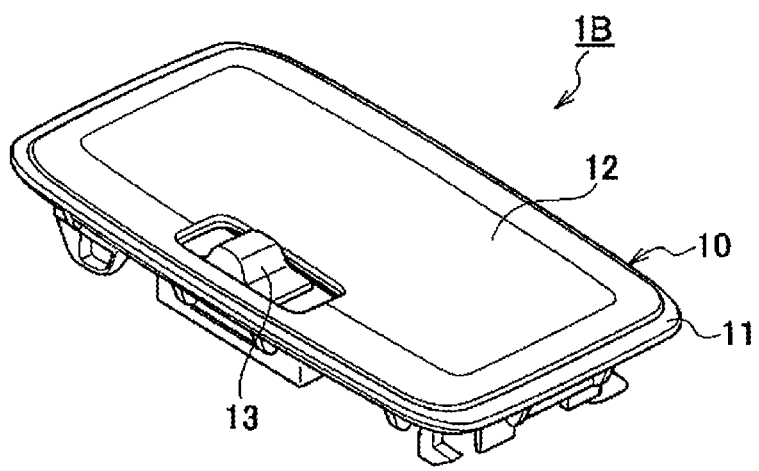
FIG. 16 shows the second embodiment of the invention and is a perspective view of the on-board interior illumination unit as viewed from an interior of a passenger compartment.
Figure 17:
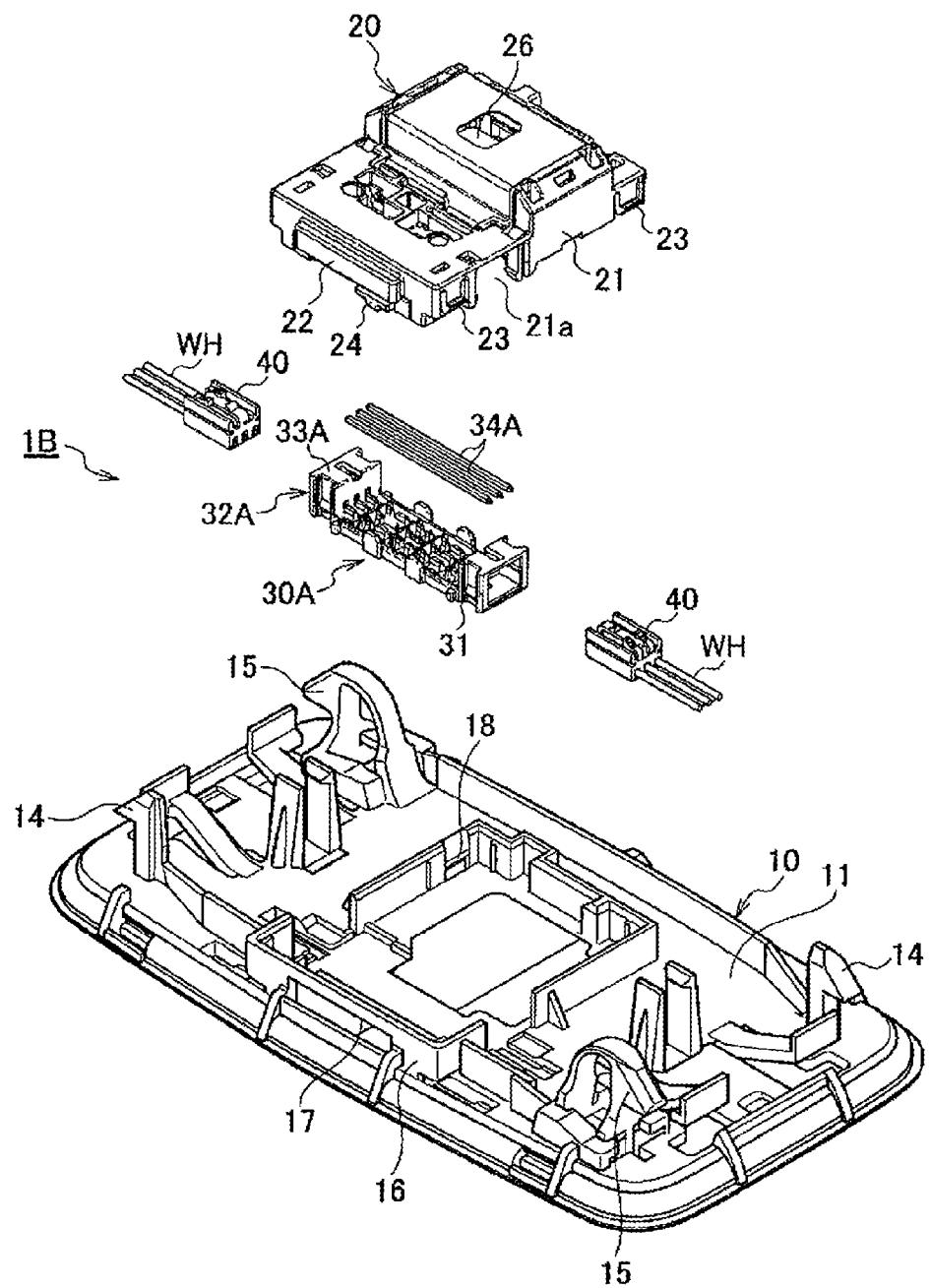
FIG. 17 shows the second embodiment of the invention and is an exploded perspective view of the on-board interior illumination unit.
Figure 18:
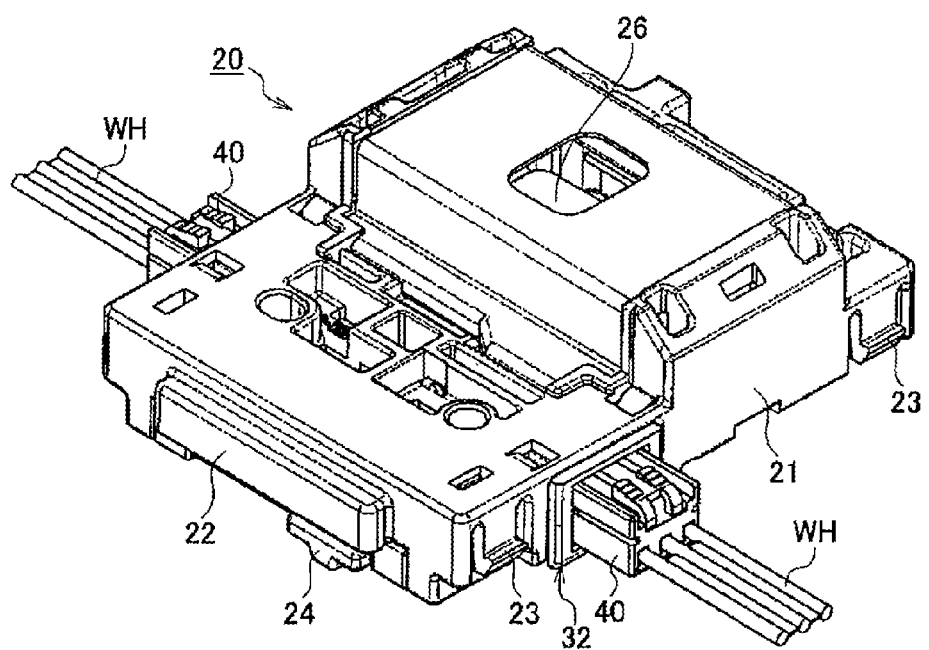
FIG. 18 shows the second embodiment of the invention and is a perspective view of a function part as viewed from the back side of the ceiling.
Figure 19:
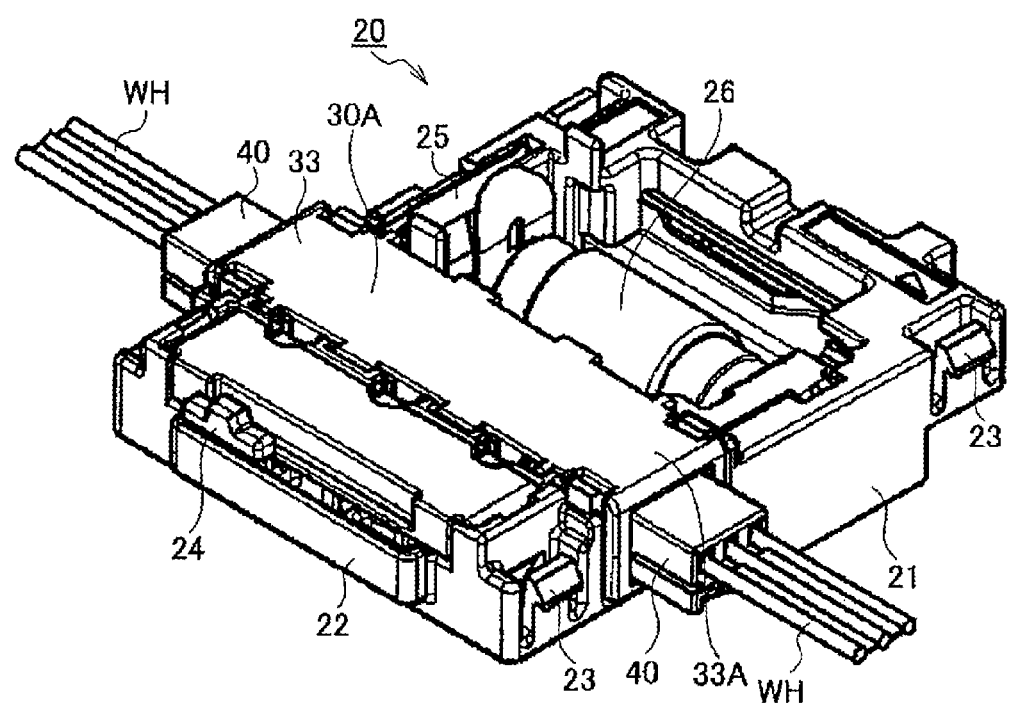
FIG. 19 shows the second embodiment of the invention and is a perspective view of the function part as viewed from the interior of the passenger compartment.
Figure 20:
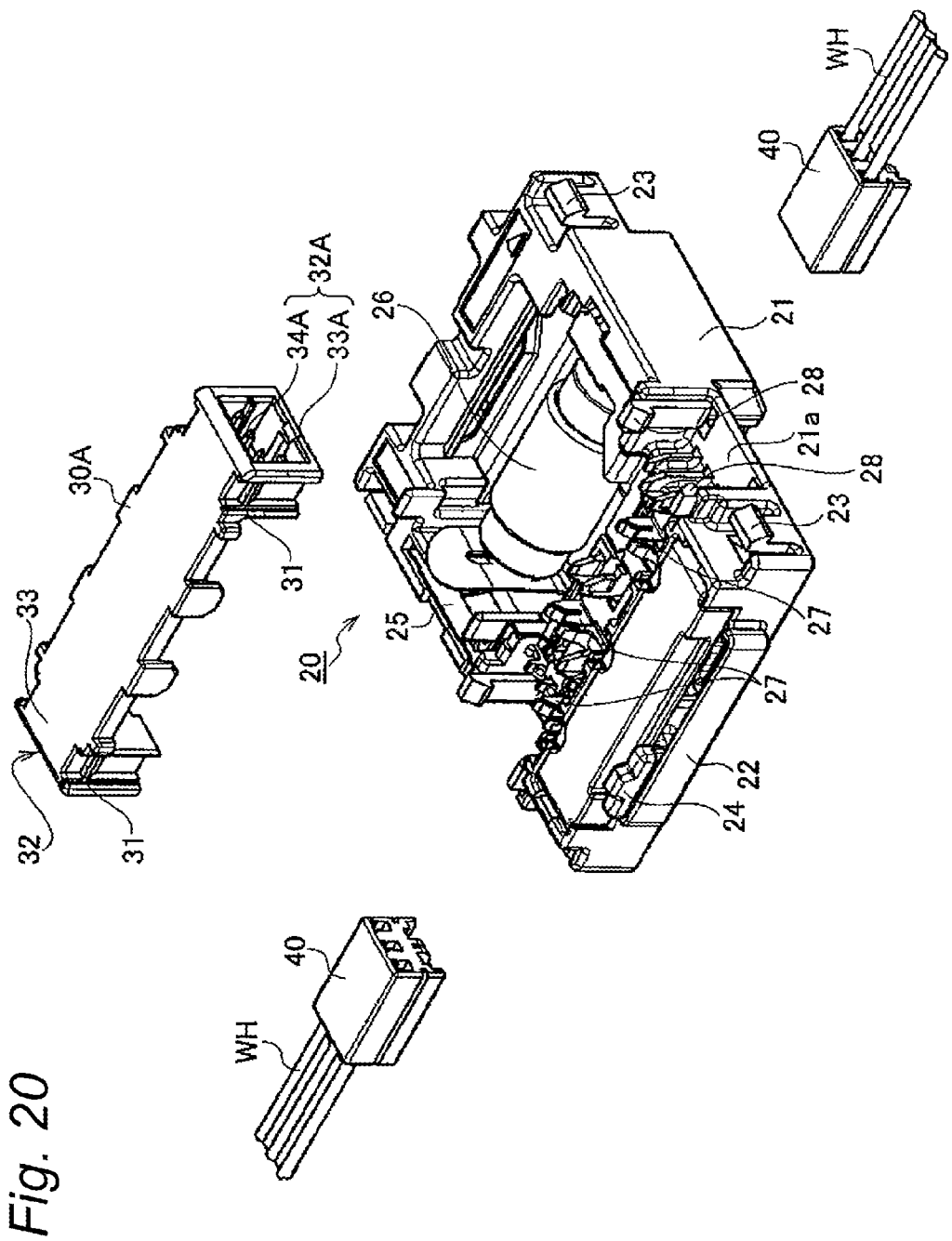
FIG. 20 shows the second embodiment of the invention and is an exploded perspective view of the function part.
Figure 21:
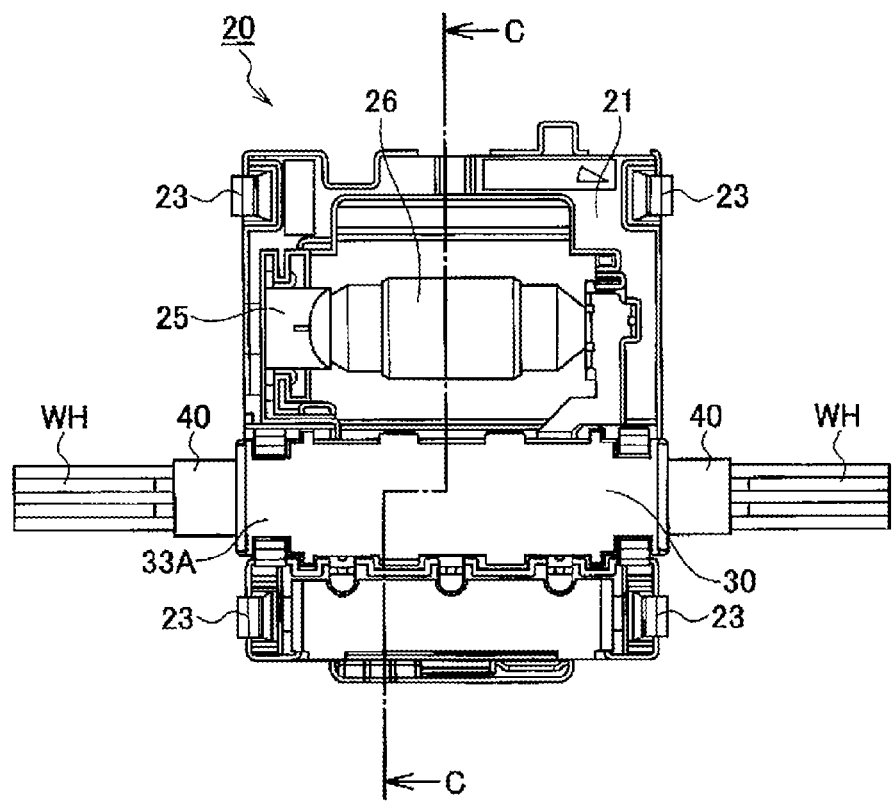
FIG. 21 shows the second embodiment of the invention and is a plan view of the function part.
Figure 22:
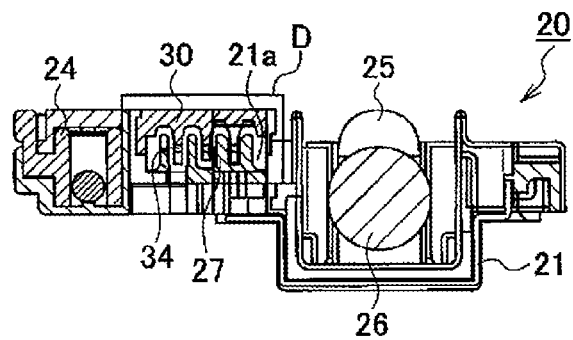
FIG. 22 shows the second embodiment of the invention and is a sectional view taken along the line C-C in FIG. 21.
Figure 23:
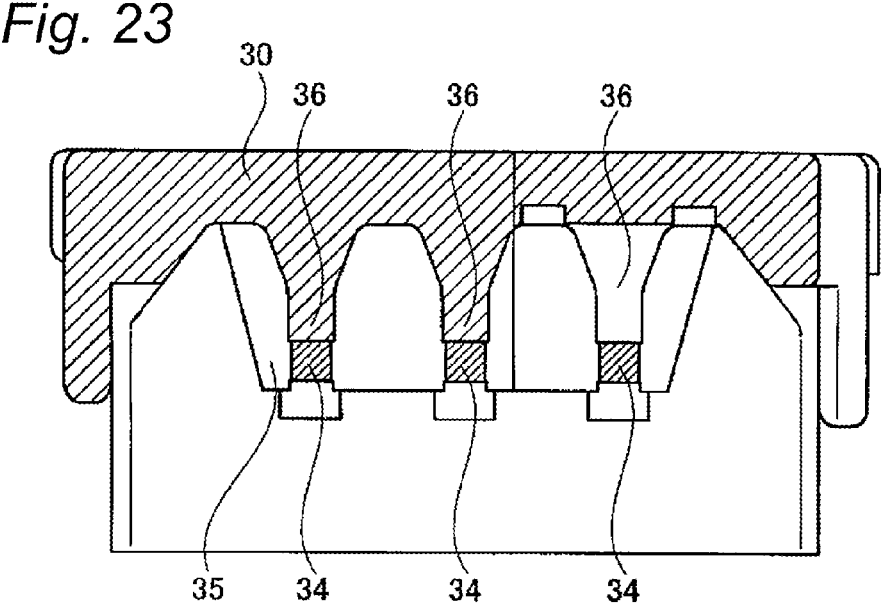
FIG. 23 shows the second embodiment of the invention and is an enlarged sectional view of a protection cover only in a portion D in FIG. 22.
Figure 24:
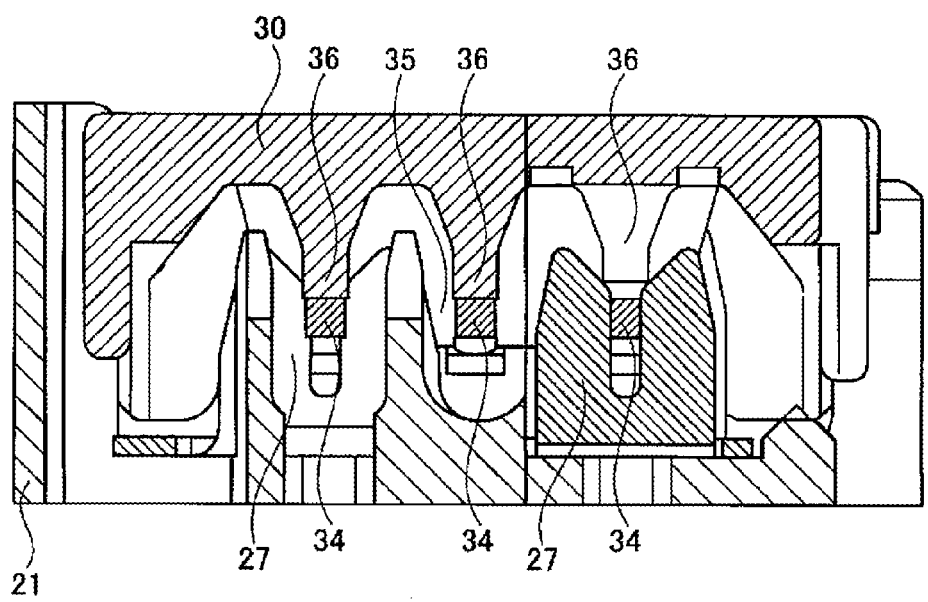
FIG. 24 shows the second embodiment of the invention and is an enlarged sectional view of the portion D in FIG. 22.
Figure 25:
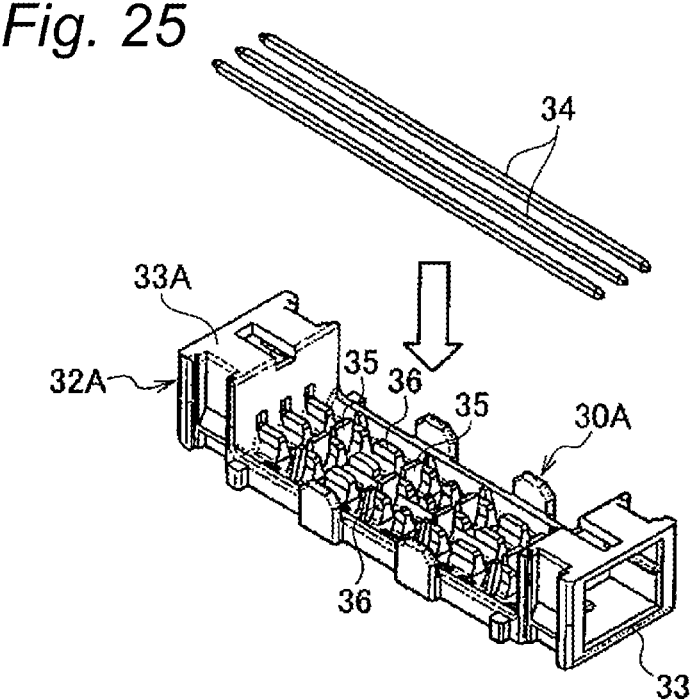
FIG. 25 shows the second embodiment of the invention and is a perspective view showing an installation step of the function part.
Figure 26:
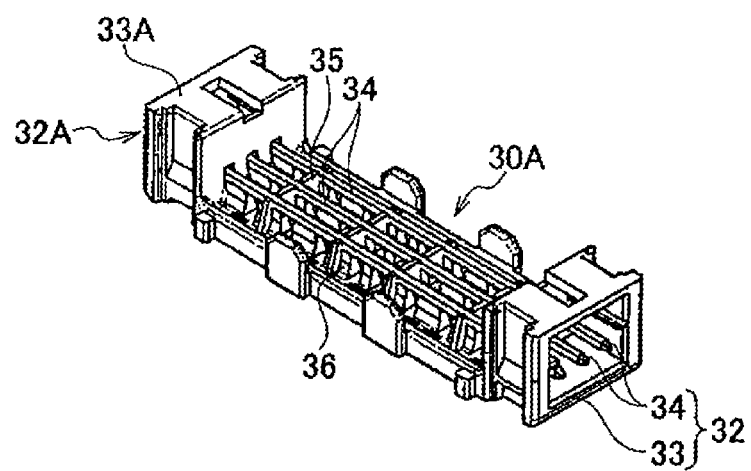
FIG. 26 shows the second embodiment of the invention and is a perspective view showing an installation step of the function part.
Figure 27:
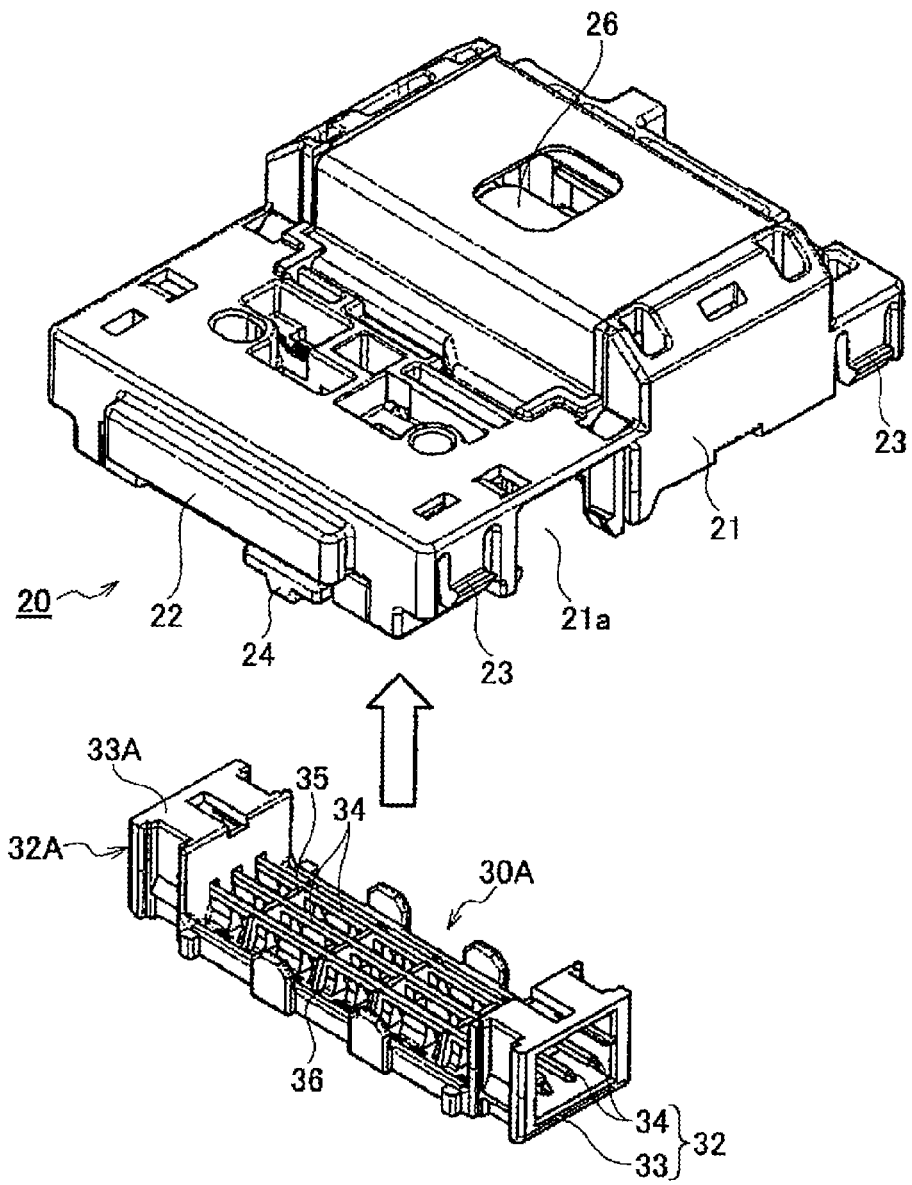
FIG. 27 shows the second embodiment of the invention and is a perspective view showing an installation step of the function part.
Figure 28:
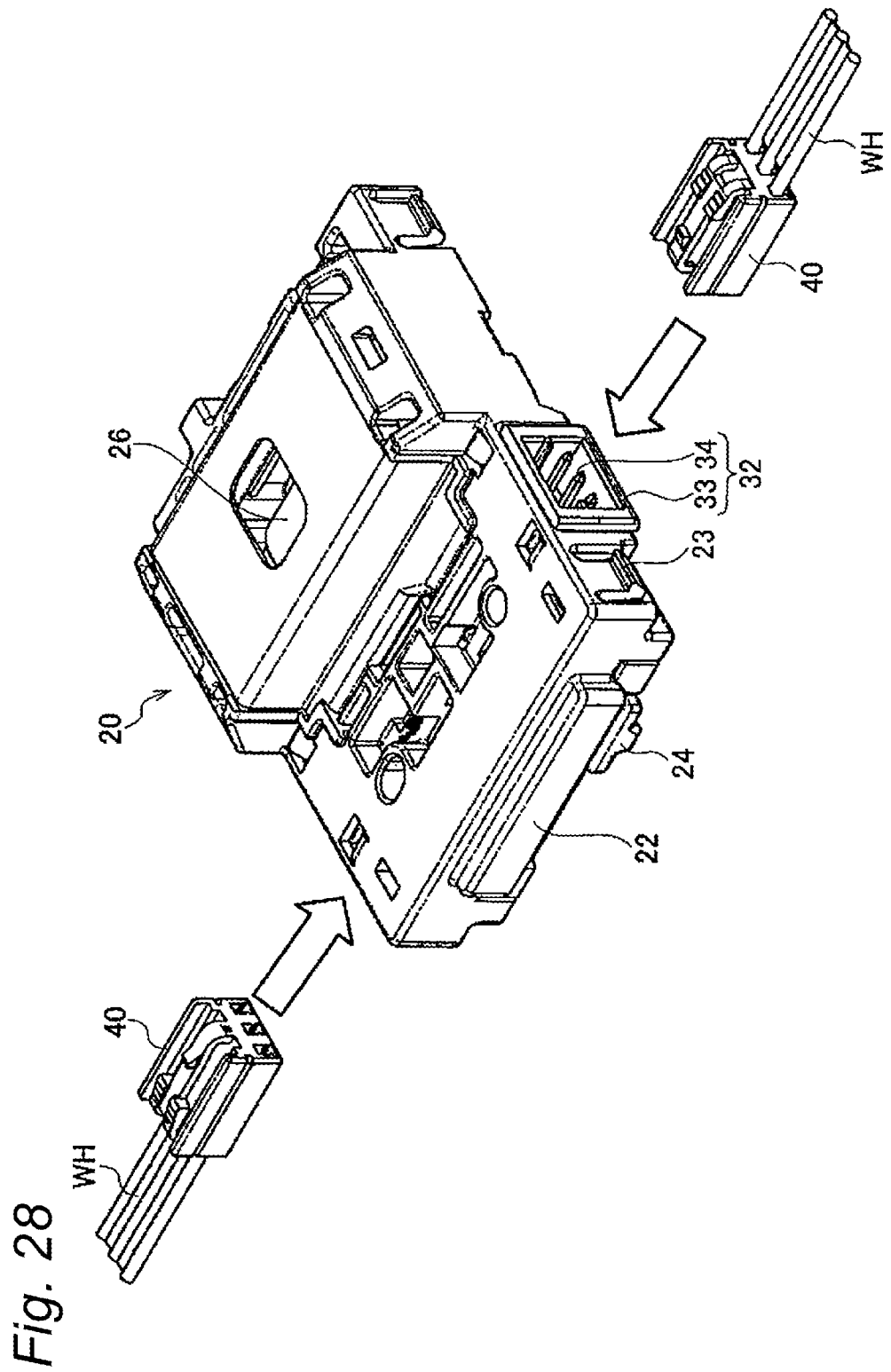
FIG. 28 shows the second embodiment of the invention and is a perspective view showing an installation process of the function part.
Figure 29:
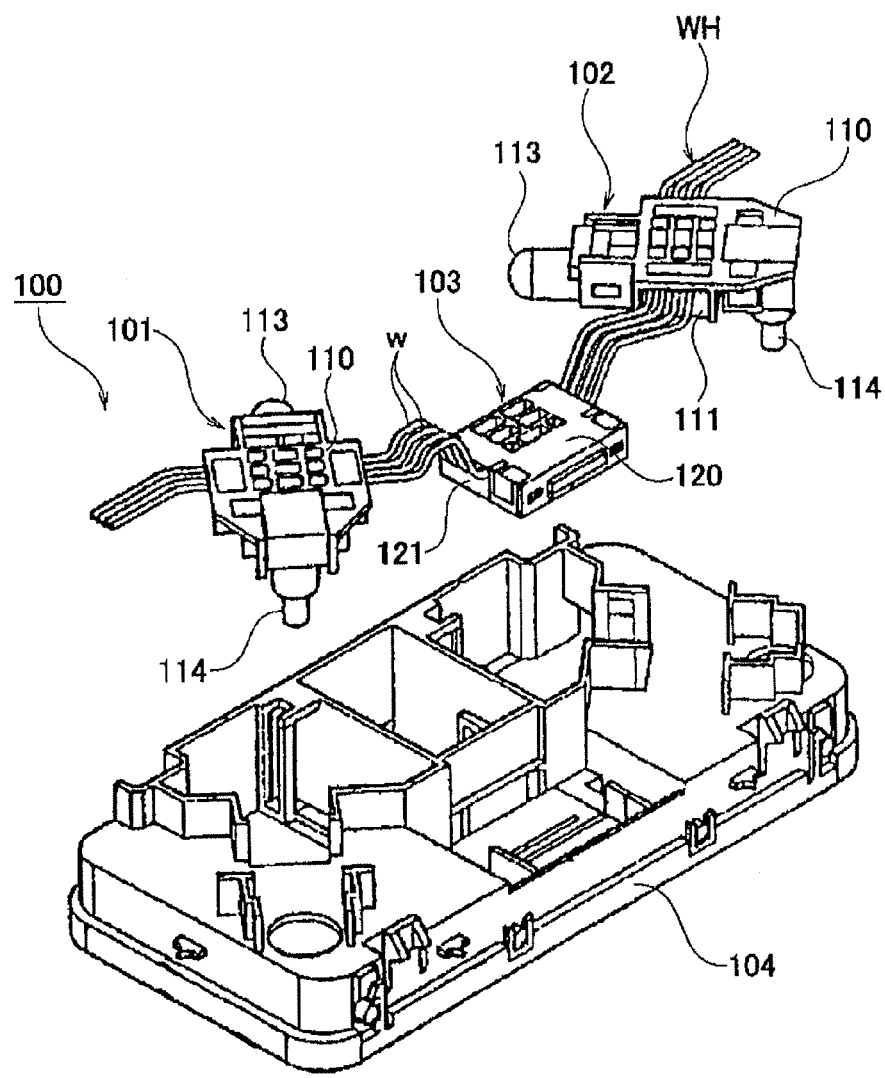
FIG. 29 is a perspective view of an on-board interior illumination system of a first conventional example.
Figure 30:
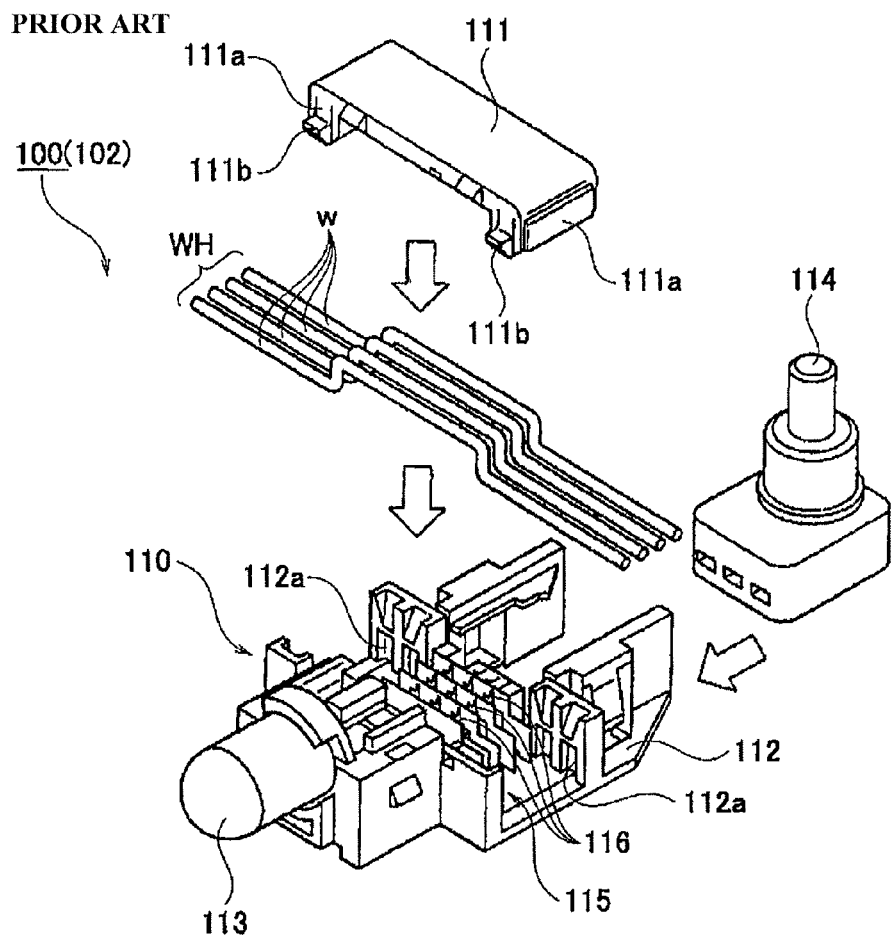
FIG. 30 is an exploded perspective view of a switch unit of the first conventional example.
Figure 31:
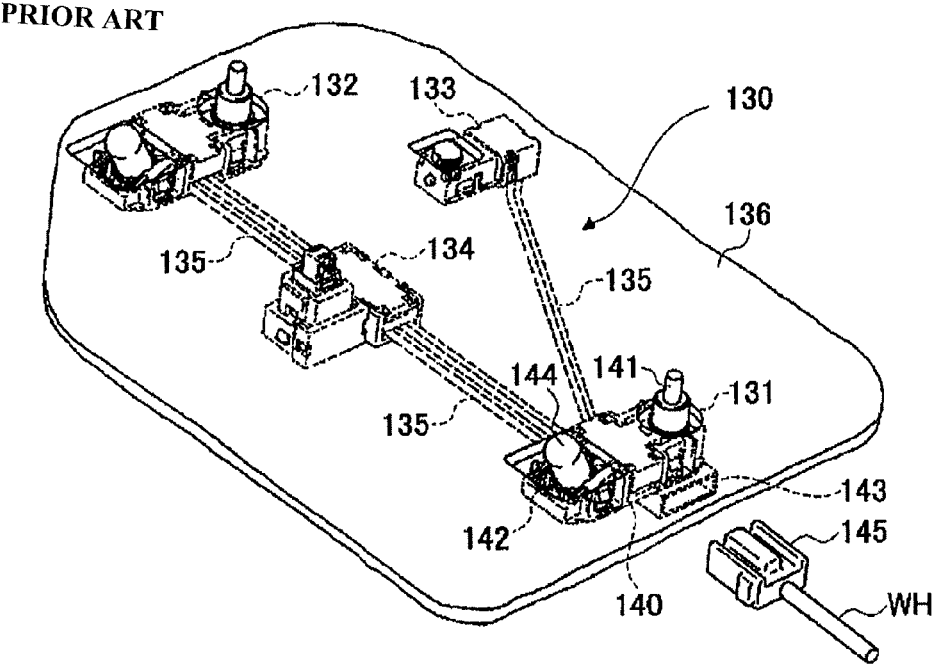
FIG. 31 is a perspective view of an on-board interior illumination system of a second conventional example.
Figure 32:
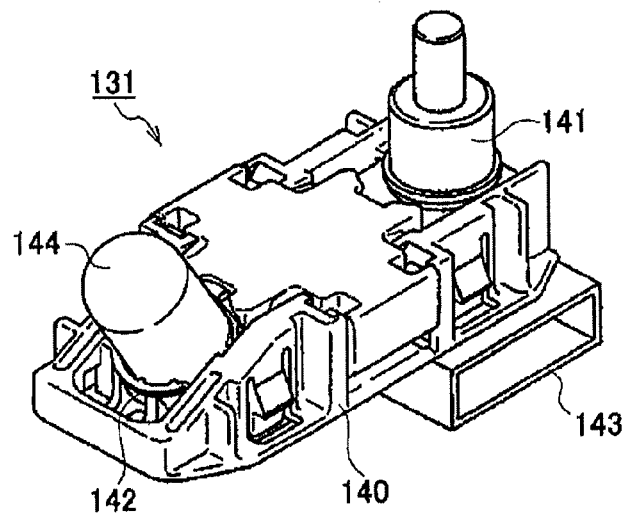
FIG. 32 is a perspective view of a switch unit of the second conventional example.

FIGS. 15 to 28 show a second embodiment. FIG. 15 is a perspective view of an on-board interior illumination unit 1B as viewed from a back side of a ceiling, FIG. 16 is a perspective view of the on-board interior illumination unit 1B as viewed from an interior of a passenger compartment, FIG. 17 is an exploded perspective view of the on-board interior illumination unit 1B, FIG. 18 is a perspective view of a function part 20 as viewed from the back side of the ceiling, FIG. 19 is a perspective view of the function part 20 as viewed from the interior of the passenger compartment, FIG. 20 is an exploded perspective view of the function part 20, FIG. 21 is a plan view of the function part 20, FIG. 22 is a sectional view taken along the line C-C in FIG. 21, FIG. 23 is an enlarged sectional view of a protection cover 30A only in a portion D in FIG. 22, FIG. 24 is an enlarged sectional view of the portion D in FIG. 22, and FIGS. 25 to 28 are perspective views showing installation steps of the function part 20.

Compared with the on-board interior illumination unit 1A of the first embodiment, an on-board interior illumination unit 1B of this second embodiment differs in the configuration of a protection cover 30A of a function part 20. Namely, two connectors 32, 32A are provided in the protection cover 30A which are adapted to fit on corresponding wiring harness side connectors 40. The two connectors 32, 32A are provided at both end sides of the protection cover 30A so that installing directions of the wiring harness side connectors 40 are 180 degrees opposite to each other. The connectors 32, 32A are made up of connector housing portions 33, 33A which are formed integrally with the protection cover 30A and pluralities of terminals 34A which are fitted in corresponding press-contact terminals 27 in a process of the terminals 34A being installed in a function part main body 21 of the protection cover 30A. Positions of the terminals 34A of the two connectors 32, 32A and press contact positions of the corresponding press-contact terminals 27 are displaced on straight lines. Consequently, compared with the first embodiment, each terminal 34A is a straight conductive angular member which is only slightly longer that the terminal 34 of the first embodiment.

The other configurations of the on-board interior illumination unit 1B are the same as those of the on-board interior illumination unit 1A of the first embodiment. Thus, like reference numerals are given to like portions of the second embodiment in the drawings to those of the first embodiment, and the description thereof will be omitted here.

Since the two connectors 32, 32A are provided in the protection cover 30A into which the wiring harness WH side connectors 40, 40 are fitted from the different directions, the degree of freedom in laying out a wiring harness WH is increased. In addition, the wiring harness WH can branch off or merge in the position of the on-board interior illumination unit 1B, and therefore, the degree of freedom in laying out other on-board interior illumination units and designing a wiring harness WH. Specifically, connector connections can be implemented from both sides of a switch unit which is an on-board interior illumination unit, whereby a wiring harness can branch off or merge at the switch unit as a boundary, thereby making it possible to providing a certain degree of freedom in laying out a lamp unit which is another on-board interior illumination unit.

While the two connectors 32, 32A are provided in this second embodiment, three or more connectors may be provided. In addition, while the two connectors 32, 32A are provided so that the installing directions are 180 degrees opposite to each other, the connectors 32, 32A may be provided so that the installing directions are opposite to each other at an angle smaller than 180 degrees.

The plurality of connectors 32, 32A are the two connectors which are provided at both the end sides of the protection cover 30A which lie on the straight line, and the positions of the terminals 34A of the two connectors 32, 32A and the press contact positions of the corresponding press-contact terminals 27 are disposed to lie on the straight lines. Thus, versatile straight terminals can be used as the terminals 34A, and therefore, the costs for terminals can be reduced and the installation thereof can also be facilitated.

According to both the embodiments, while the function part 20 has both the switch portion 24 and the lamp installation portion 25, the invention can also be applied to a function part which has only a switch portion (a switch unit) or only a lamp installation portion 25 (a lamp unit).

In both the embodiments, while the on-board interior illumination units 1A, 1B are described as being installed in the ceiling of the passenger compartment, the installing place is not limited to the ceiling of the passenger compartment.

REFERENCE SIGNS LIST 1A, 1B on-board interior illumination unit
10 design portion; 20 function part
21 function part main body
21a terminal exposure portion
24 switch portion
25 lamp installation portion
27 press-contact terminal
30, 30A protection cover
32, 32A connector
33, 33A connector housing portion
34, 34A terminal
40 connector
WH wiring harness

The invention claimed is:

1. An on-board interior illumination unit comprising: a design portion which is fixed to a body side member; and a function part which is disposed on a side of the design portion which lies on an outer side of a passenger compartment,
   wherein the function part includes: a function part main body which has at least one of a switch portion and a lamp installation portion and a terminal exposure portion in which a plurality of press-contact terminals are exposed which are electrically connected to at least the one of the switch portion and the lamp installation portion; and a protection cover which is installed in the function part main body so as to cover the terminal exposure portion, and
   wherein a protection cover side connector is provided in the protection cover which fits on a wiring harness side connector, and the protection cover side connector includes a connector housing portion which is integrally formed with the protection cover and a plurality of terminals which are fixed in the protection cover and which fit respectively in the press-contact terminals in a process of the protection cover being attached to the function part main body.

2. The on-board interior illumination unit according to claim 1, wherein
   positions of the terminals of the protection cover side connector and press contact positions of the corresponding press-contact terminals are disposed on straight lines.

3. The on-board interior illumination unit according to claim 1, wherein
   the protection cover is configured to be attached to the function part main body so as to cover the terminal exposure portion in a state where a wiring harness is press connected to the press-contact terminals through press-contact.

4. The on-board interior illumination unit according to claim 1, wherein
   a plurality of protection cover side connectors like the protection cover side connector are provided in the protection cover so that installing directions into the protection cover side connectors differ from each other.

5. The on-board interior illumination unit according to claim 4, wherein
   the plurality of protection cover side connectors are two connectors which are provided at both end sides of the protection cover which lie on a straight line, and positions of terminals of the two protection cover side connectors and press contact positions of the corresponding press-contact terminals are disposed to line on straight lines.

6. The on-board interior illumination unit configured to claim 1, wherein
   holes are provided in a bottom portion of the connector housing portion through which the terminals are inserted.

7. A vehicle interior illumination function part, comprising:
   a main body, including: at least one of a lamp installation portion and a switch portion;
   and a terminal exposure portion in which a plurality of press-contact terminals are exposed, the press-contact terminals being electrically connected to at least the one of the lamp installation portion and the switch portion; and
   a protection cover including: a cover main body to which a plurality of terminals connected to the press-contact terminals are fixed; and a protection cover side connector which covers a wiring harness side connector which is electrically connected to the function part and which includes a connector housing which is integrally formed with the cover main body, and configured to cover the terminal exposure portion.

8. The vehicle interior illumination function part according to claim 7, wherein
   positions of the terminals of the protection cover side connector and press contact positions of the corresponding press-contact terminals are disposed on straight lines.

9. The vehicle interior illumination function part according to claim 7, wherein
   the protection cover is configured to be attached to the function part main body so as to cover the terminal exposure portion in a state where a wiring harness is press connected to the press-contact terminals through press-contact.

10. The vehicle interior illumination function part according to claim 7, wherein
    a plurality of protection cover side connectors like the protection cover side connector are provided in the protection cover so that installing directions into the protection cover side connectors differ from each other.

11. The vehicle interior illumination function part according to claim 10, wherein
    the plurality of protection cover side connectors are two connectors which are provided at both end sides of the protection cover which lie on a straight line, and positions of terminals of the two protection cover side connectors and press contact positions of the corresponding press-contact terminals are disposed to line on straight lines.

12. The vehicle interior illumination function part according to claim 7, wherein
    holes are provided in a bottom portion of the connector housing portion through which the terminals are inserted.

* * * * *